United States Patent [19]
Campbell et al.

[11] Patent Number: 5,164,210
[45] Date of Patent: Nov. 17, 1992

[54] ZEIN/SHELLAC ENCAPSULATION OF HIGH INTENSITY SWEETENERS IN CHEWING GUM

[75] Inventors: Adebisi A. Campbell, Chicago; Steven E. Zibell, Tinley Park, both of Ill.

[73] Assignee: Wm. Wrigley Jr. Company, Chicago, Ill.

[21] Appl. No.: 772,929

[22] Filed: Oct. 8, 1991

[51] Int. Cl.⁵ .............................................. A23G 3/30
[52] U.S. Cl. ........................................ 426/5; 426/548; 426/96; 426/804; 426/302; 426/310
[58] Field of Search ................... 426/5, 548, 804, 302, 426/310, 96

[56] References Cited

U.S. PATENT DOCUMENTS

| | | | |
|---|---|---|---|
| 4,384,004 | 5/1983 | Cea et al. | 426/5 |
| 4,386,106 | 5/1983 | Merritt et al. | 426/5 |
| 4,863,745 | 9/1989 | Zibell | 426/5 |
| 4,919,941 | 4/1990 | Zibell | 426/5 |
| 4,931,295 | 6/1990 | Courtright et al. | 426/5 |

*Primary Examiner*—Jeanette Hunter
*Attorney, Agent, or Firm*—Willian Brinks Olds Hofer Gilson & Lione

[57] ABSTRACT

A stabilized high intensity sweetener ingredient for use in chewing gum is prepared by encapsulating a high intensity sweetener using a mixture of about 75 to about 99 weight percent zein and about 25 to about 1 weight percent shellac. This combination of zein and shellac prolongs the shelf life of the chewing gum and the high intensity sweetener, to a greater extent than zein or shellac used individually or in other combinations.

30 Claims, 1 Drawing Sheet

STABILITY OF ASPARTAME
GRANULATIONS USING RATIOS
OF SHELLAC AND ZEIN

STORAGE TIME

—•— 1 WEEK      —+— 2 WEEKS
—*— 4 WEEKS    —□— 19 WEEKS

ZEIN/SHELLAC ENCAPSULATION OF HIGH INTENSITY SWEETENERS IN CHEWING GUM

FIELD OF THE INVENTION

The present invention relates to a unique combination of zein and shellac which has been found to provide improved encapsulation of high intensity sweeteners used in chewing gum.

BACKGROUND OF THE INVENTION

Zein, shellac and other materials have been used as encapsulating agents for high intensity sweeteners. The term "high intensity sweeteners" is defined herein to include sugarless sweeteners having a degree or intensity of sweetness which is many times greater than sucrose. High intensity sweeteners include, but are not necessarily limited to, aspartame, sucralose, salts of acesulfame, alitame, glycyrrhizin, saccharin and its salts, cyclamic acid and its salts, dihydrochalcones, thaumatin, monellin and the like, alone or in combination.

High intensity sweeteners benefit from or require encapsulation in order to achieve a gradual and controlled release of sweetener during chewing and/or to promote their stability in chewing gum. For example, certain artificial dipeptide sweeteners such as aspartame (L-aspartyl-L-phenylanaline methyl ester) have been found to be excellent sugar substitutes in chewing gum. However, the stability of artificial dipeptide sweeteners depends on exposure to moisture, time, temperature and pH. Under unfavorable conditions, aspartame spontaneously converts to diketopiperazine with proportional loss of sweetness. Aspartame also degrades when exposed to aldehyde-type flavoring agents. In order to maintain the stability and sweetness of aspartame in chewing gum, it is necessary to minimize the exposure of aspartame to moisture, aldehyde-type flavors, and certain pH conditions.

Zein, shellac and many other materials have been used to encapsulate aspartame and other high intensity sweeteners, in order to control the stabilities and rates of release of the sweeteners. For instance, U.S. Pat. No. 4,673,577 discloses the use of shellac, individually, to encapsulate high intensity sweeteners. U.S. Pat. No. 4,863,745 discloses the use of zein to coat high intensity sweeteners which have already been once coated with another material. The previous coating can be shellac.

U.S. Pat. No. 4,931,295 discloses the coating of aspartame and other high intensity sweeteners with a mixture of zein and hydroxypropylmethyl cellulose. U.S. Pat. No. 4,384,004 discloses several coating materials for aspartame, including zein. PCT Publication WO 90/06061 discloses the use of equal amounts of zein and shellac mixed together, to coat alitame.

European Patent Application No. 0 320 523 discloses the use of zein, shellac and other materials to agglomerate high intensity sweetener particles in a solvent. U.S. Pat. Nos. 4,122,195 and 4,139,639 disclose the fixation of aspartame in reaction product of a compound containing a polyvalent metal ion, with an ungelatinized starch acid-ester of a substituted dicarboxylic acid. U.S. Pat. No. 4,386,106 discloses an encapsulant for a flavoring material, composed of gelatin, a natural gum and a plasticizer. U.S. Pat. No. 4,485,118 discloses the use of shellac to encapsulate a flavoring material.

U.S. Pat. No. 4,590,075 discloses an elastomer system for encapsulating flavor and sweetening agents. U.S. Pat. No. 4,722,845 discloses the encapsulation of dipeptide and amino acid sweeteners in a mixture of fat and polyethylene wax. U.S. Pat. No. 3,116,206 discloses generally the use of zein as an encapsulant.

SUMMARY OF THE INVENTION

The present invention involves a unique combination of zein and shellac which acts as a better encapsulant than either zein or shellac used individually. The inventive combination falls within the range of about 75 weight per cent zein and about 25 weight per cent shellac to about 99 weight per cent zein and about one weight per cent shellac. The present invention includes a method for encapsulating a high intensity sweetener using the inventive combination, and a stabilized sweetener ingredient prepared using the inventive combination. The invention also includes a chewing gum composition containing a quantity of the stabilized sweetener ingredient of the invention.

In order to practice the invention, a quantity of zein can be mixed with ethyl alcohol to form a first mixture. Then, a quantity of shellac can be mixed with ethyl alcohol to form a second mixture. The first and second mixtures are combined to form a third mixture. The third mixture is combined with a high intensity sweetener, and the resulting combination is air dried to form encapsulated sweetener. The encapsulated sweetener is ground into small particles or powder to form the stabilized sweetener ingredient of the invention. The stabilized sweetener ingredient is then combined into a standard chewing gum (i.e. a sugarless chewing gum) formula.

With the foregoing in mind, it is a feature and advantage of the invention to encapsulate a high intensity sweetener using a combination of zein and shellac that acts as a better encapsulant than zein or shellac used individually.

It is also a feature and advantage of the invention to provide an improved stabilized high intensity sweetener ingredient for use in chewing gum, particularly sugarless chewing gum.

It is also a feature and advantage of the invention to provide a chewing gum, particularly a sugarless chewing gum, which contains the stabilized high intensity sweetener ingredient of the invention.

These and other features and advantages of the invention will become apparent from the following detailed description of the presently preferred embodiments, read in conjunction with the accompanying drawing. It should be understood that this description is illustrative rather than limitative, the scope of the invention being defined by the appended claims and equivalents thereof.

DETAILED DESCRIPTION OF THE PRESENTLY PREFERRED EMBODIMENTS

Figure 1:
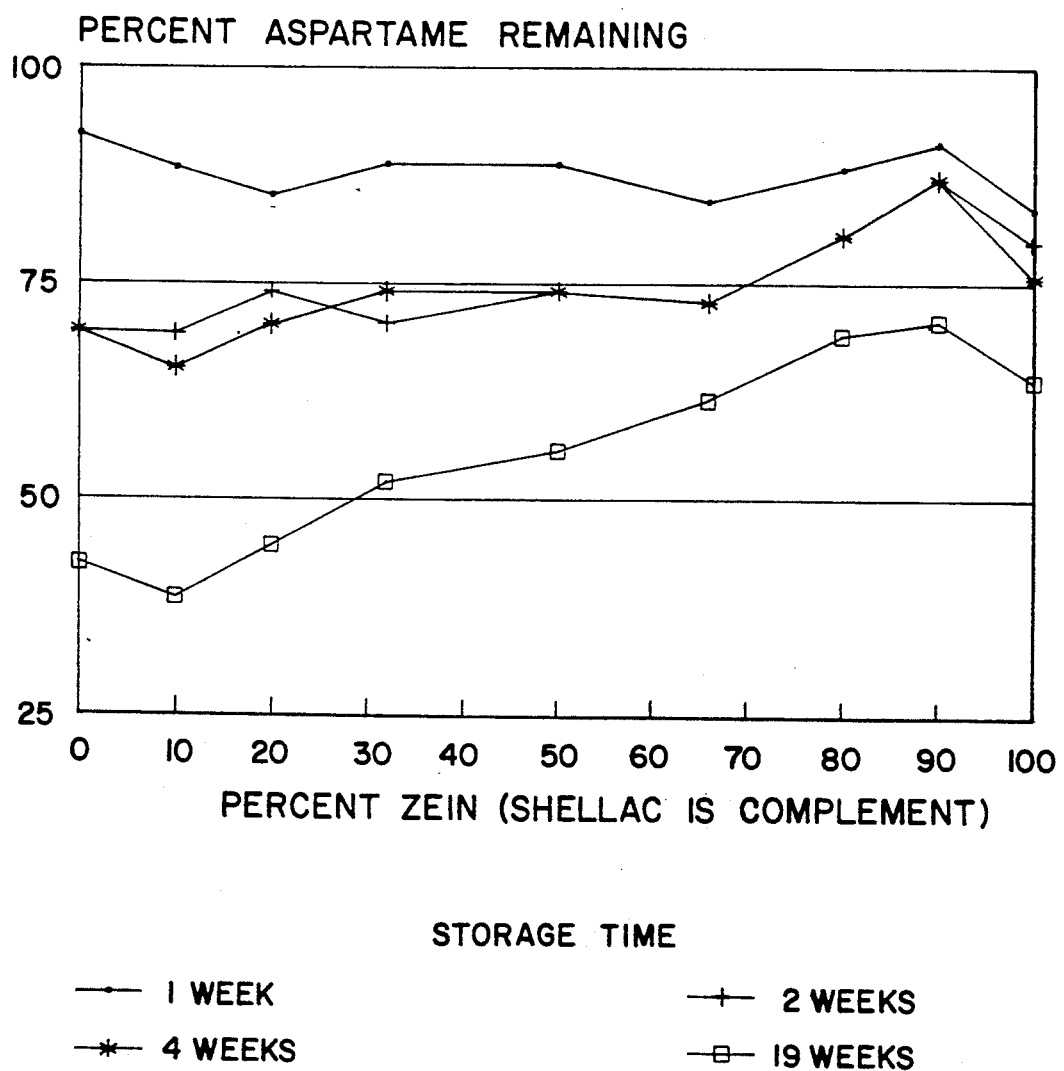
FIG. 1 shows the per cent aspartame remaining as a function of time (based on original amount added) using zein/shellac encapsulant blends containing various percentages of zein by weight. Data are provided for storage times of one week, two weeks, four weeks and nineteen weeks.

In accordance with the presently preferred embodiment, a first mixture is prepared by gradually adding zein to ethyl alcohol with constant mixing of the components. In the laboratory, the mixing can be accomplished using a TLine Laboratory Stirrer available from Talboys Engineering Corp., Emerson, N.J. The presently preferred mixing conditions include a mixer rpm of about 375, a mixing temperature of about 85–90° F., and a total mixing time of about 20 minutes. The total mixing time includes an addition time of about 10 minutes during which the zein is added to the ethyl alcohol, and further mixing time of about 10 minutes after the addition of zein has been completed.

The first mixture contains about 10 to about 50 weight per cent zein and about 90 to about 50 weight per cent ethyl alcohol. Preferably, the first mixture contains about 20 to about 35 weight per cent zein and about 80 to about 65 weight per cent ethyl alcohol. Most preferably, the first mixture contains about 28 weight per cent zein and about 72 weight per cent ethyl alcohol. A commercially available zein suitable for use with the present invention can be obtained from Freeman Corn Products. Any food grade zein may alternatively be used.

Next, a second mixture is prepared by gradually adding shellac to ethyl alcohol with constant mixing of the components. In the laboratory, the mixing can be accomplished using a TLine Laboratory Stirrer. The presently preferred mixing conditions include a mixer rpm of about 375, a mixing temperature of about 85–90° F., and a total mixing time of about 20 minutes. The total mixing time includes an addition time of about 10 minutes during which the shellac is added to the ethyl alcohol, and further mixing time of about 10 minutes after the addition of shellac has been completed.

The second mixture contains about 10 to about 50 weight per cent shellac and about 90 to about 50 weight per cent ethyl alcohol. Preferably, the second mixture contains about 20 to about 35 weight per cent shellac and about 80 to about 65 weight per cent ethyl alcohol. Most preferably, the second mixture contains about 28 weight per cent shellac and about 72 weight per cent ethyl alcohol. A commercially available shellac which is suitable for use with the invention can be obtained from Bradshaw Praeger and Co. Any food grade shellac may alternatively be used.

Next, a third mixture is prepared by blending the first and second mixtures together. The first and second mixtures can be combined using a TLine Laboratory Stirrer at a speed of about 375 rpm, a mixing temperature of 85–90° F., and a mixing time of about 15 minutes. The first and second mixtures are combined in such quantities that the third mixture contains about 75 to about 99 per cent zein and about 25 to about 1 per cent shellac, based on the combined total weight of zein and shellac (i.e. excluding the ethyl alcohol). Preferably, the third mixture contains about 80 to about 95 per cent zein and about 20 to about 5 per cent shellac, based on the combined total weight of zein and shellac. Most preferably, the third mixture contains about 90 per cent zein and about 10 per cent shellac, based on the combined total weight of zein and shellac.

The third mixture is then combined with a high intensity sweetener to form a sweetener/encapsulant mixture. The third mixture can be combined with a high intensity sweetener using a Hobart mixer available from Hobart Mixer Corp., Troy, Ohio. The presently preferred mixing conditions include a speed of about 45 rpm at about room temperature. The third mixture is gradually added to the high intensity sweetener over a time period of about 10 minutes. Then, the ingredients are blended for about another 5 minutes.

The sweetener/encapsulant mixture contains about 40 to about 95 per cent high intensity sweetener and about 5 to about 60 per cent encapsulant (i.e., zein/shellac combination), based on the total weight of high intensity sweetener and encapsulant (i.e., excluding the weight of the ethyl alcohol). Preferably, the sweetener/encapsulant mixture contains about 60 to about 90 per cent high intensity sweetener and about 10 to about 40 per cent encapsulant, based on the combined weight of high intensity sweetener, zein and shellac. Most preferably, the sweetener/encapsulant mixture contains about 80–85 per cent high intensity sweetener and about 15–20 per cent encapsulant, based on the combined weight of high intensity sweetener and encapsulant.

The encapsulation process is completed by removing the ethyl alcohol from the sweetener/encapsulant mixture. Preferably, this is accomplished by air drying the sweetener/encapsulant mixture in a fume hood at about room temperature, for a time period of about 16 hours.

The dried sweetener/encapsulant mixture can be ground using a Fitz Hammermill at high speed through a 0.4 inch screen, to form the stabilized high intensity sweetener ingredient of the invention. Other grinding techniques are also possible, the only limitation being that the particles or powder produced must be of a size which is suitable for use in chewing gum. The stabilized high intensity sweetener ingredient is now ready for use in a standard (i.e. sugarless) chewing gum composition.

A chewing gum composition generally includes a water soluble bulk portion, a water insoluble chewing gum base portion and one or more flavoring agents. The water soluble portion dissipates over a period of time during chewing. The gum base portion is retained in the mouth throughout the chewing process.

The insoluble gum base generally includes elastomers, resins, fats, oils, waxes, softeners and inorganic fillers. The elastomers may include polyisobutylene, isobutylene-isoprene copolymer, styrene butadiene rubber and natural latexes such as chicle. The resins may include polyvinyl acetate and terpene resins. Low molecular weight polyvinyl acetate is a preferred resin. Fats and oils may include animal fats such as lard and tallow, vegetable oils such as soybean and cottonseed oils, hydrogenated and partially hydro. generated vegetable oils, and cocoa butter. Commonly used waxes include petroleum waxes such as paraffin and microcrystalline wax, natural waxes such as beeswax, candellia, carnauba and polyethylene wax. The present invention contemplates the use of any commercially acceptable chewing gum base.

The gum base typically also includes a filler component such as calcium carbonate, magnesium carbonate, talc, dicalcium phosphate and the like; elastomers, including glycerol monostearate and glycerol triacetate; and optional ingredients such as antioxidants, colors and emulsifiers. Since a small amount of acid is used in this invention, it is preferable to use a calcium carbonate-free filler, for instance, a talc filler. The gum base constitutes between 5–95% by weight of the chewing gum composition, more typically 10–50% by weight of the chewing gum, and most commonly 20–35% by weight of the chewing gum.

The water soluble portion of the chewing gum generally constitutes between 5 and 95% by weight of the chewing gum, preferably between 20 and 80% by weight of the gum. The bulk portion may include softeners, bulk sweeteners, high intensity sweeteners and combinations thereof. Softeners are added to the chewing gum in order to optimize the chewability and mouth feel of the gum. The softeners, which are also known as plasticizers or plasticizing agents, generally constitute between about 0.5-15% by weight of the chewing gum, preferably between 0.1 and 10% by weight of chewing gum. The softeners may include glycerin, lecithin, and combinations thereof. The softeners may also include aqueous sweetener solutions such as those containing sorbitol, hydrogenated starch hydrolysates, corn syrup and combinations thereof.

Bulk sweeteners constitute between 5-95% by weight of the chewing gum, more typically 20-80% by weight of the chewing gum and most commonly 30-60% by weight of the chewing gum. Bulk sweeteners may include both sugar and sugarless sweeteners and components. For the present invention, sugarless sweeteners are preferred. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, and the like, alone or in combination.

High intensity sweeteners may also be present. When used, high intensity sweeteners typically constitute between 0.001-5.0% by weight of the chewing gum, preferably between 0.01-1.0% by weight of the chewing gum. These may include but are not limited to sucralose, aspartame, salts of acesulfame, alitame, glycyrrhizin, saccharin and its salts, cyclamic acid and its salts, dihydrochalcones, thaumatin, monellin, and the like, alone or in combination.

When the stabilized encapsulated high intensity sweetener ingredient of the invention is used to stabilize aspartame or another high intensity sweetner, the stabilized sweetener ingredient is added to the chewing gum in an amount of about 0.001 to about 25% by weight of the chewing gum. Preferably, the stabilized high intensity sweetener ingredient constitutes about 0.01 to about 5% by weight of the chewing gum, and most preferably about 0.1 to about 1% by weight. The amount of stabilized sweetener ingredient may vary according to the amount and type of flavoring agent, the specific type of high intensity sweetener used in forming the stabilized sweetener ingredient, and other factors.

Combinations of sugar and/or sugarless sweeteners may be used in chewing gum. The sweetener may also function in the chewing gum in whole or in part as a water soluble bulking agent. Additionally, the softener may also provide additional sweetness such as with aqueous sugar or alditol solutions.

The stabilizing method of the invention is particularly useful for stabilizing aspartame in the presence of aldehyde-type flavoring agents which otherwise would react with unstabilized aspartame. For instance, cinnamon flavor contains cinnamic aldehyde which reacts with aspartame, causing a loss in flavor and sweetness. Other aldehyde-type flavoring agents contain benzaldehyde, acetaldehyde, etc., which may also react with unencapsulated aspartame.

The chewing gum may contain other flavoring agents in addition to, or instead of, aldehyde-based flavor. Other flavoring agents may include, but are not necessarily limited to, oils derived from plants and fruits such as citrus oils, mint oils, fruit essences, clove oil, oil of wintergreen, anise and the like. Artificial flavoring agents may also be used either alone or in combination with natural flavoring agents. In general the flavoring agent(s) should be present in the chewing gum in an amount between 0.1 and 15% by weight of the chewing gum, more preferably between 0.2 and 5.0% by weight of the chewing gum and most preferably between 0.5 and 3.0% by weight.

Optional ingredients such as colors, emulsifiers, pharmaceutical agents and additional flavoring agents may also be included in chewing gum.

Chewing gum is generally manufactured by sequentially adding the various chewing gum ingredients to any commercially available mixer known in the art. After the ingredients have been thoroughly mixed, the gum mass is discharged from the mixer and shaped into the desired form such as by rolling into sheets and cutting into sticks, extruding into chunks, or casting into pellets. Generally, the ingredients are mixed by first melting the gum base and adding it to the running mixer. The gum base may alternatively be melted in the mixer. Color and emulsifiers can be added at this time.

A softener such as glycerin can be added next along with syrup and part of the bulk portion. Further parts of the bulk portion may then be added to the mixer. Flavor ingredients are typically added with the final part of the bulk portion. The entire mixing process typically takes from five to fifteen minutes, although longer mixing times are sometimes required. Those skilled in the art will recognize that variations of this mixing procedure, or other mixing procedures, may be followed.

A wide range of changes and modifications to the embodiments of the invention described above will be apparent to persons skilled in the art. The following examples are not to be construed as imposing limitations on the invention, but are included merely to illustrate preferred embodiments.

EXAMPLES 1-9

A first mixture was prepared by slowly adding 196 grams of zein to 504 grams of ethyl alcohol, at constant mixing. The zein used was obtained from Freeman Corn Products. The mixing was accomplished using a TLine Laboratory Stirrer at a mixing speed of 375 rpm, a mixing temperature of 85-90° F., and a total mixing time of 20 minutes. The total mixing time included 10 minutes of time during which the zein was slowly added, and 10 minutes of time after the addition of zein was complete.

A second mixture was prepared by slowly adding 196 grams of shellac to 504 grams of ethyl alcohol, at constant mixing. The shellac used was obtained from Bradshaw Praeger and Co. The mixing was accomplished using a TLine Laboratory Stirrer at a mixing speed of 375 rpm, a mixing temperature of 85 90° F., and a total mixing time of 20 minutes. The total mixing time included 10 minutes of time during which the shellac was slowly added, and 10 minutes of time after the addition of shellac was complete.

The first and second mixtures constituted a 28% by weight zein solution and a 28% by weight shellac solution, respectively. The first and second mixtures were then combined in various ratios according to the following Table 1, using a TLine Laboratory Stirrer mixer and a mixing time of 15 minutes, a speed of 375 rpm and a temperature of 85-90° F.

TABLE 1

| Example | Ratios Of Zein To Shellac | |
|---|---|---|
| | 28% Zein Solution | 28% Shellac Solution |
| 1 | 0 | 100 |

TABLE 1-continued

| Example | Ratios Of Zein To Shellac | |
|---|---|---|
| | 28% Zein Solution | 28% Shellac Solution |
| 2 | 10 | 90 |
| 3 | 20 | 80 |
| 4 | 33.3 | 66.7 |
| 5 | 50 | 50 |
| 6 | 66.7 | 33.3 |
| 7 | 80 | 20 |
| 8 | 90 | 10 |
| 9 | 100 | 0 |

The zein/shellac mixtures were added slowly to individual aspartame samples over a period of 10 minutes using a Hobart mixer at room temperature and a mixing speed of 45 rpm. After addition was complete, each sample was further mixed for an additional 5 minutes. The resulting aspartame/encapsulant blends were then air dried at room temperature for a time period of 16 hours. Once dry, each encapsulated aspartame product was ground using a Fitz hammermill at high speed through a 0.4 inch opening screen. The following Table 2 shows the composition of each encapsulated aspartame product.

TABLE 2

| Composition Of Encapsulated Aspartame Samples (% by weight) | | | | |
|---|---|---|---|---|
| Example | Aspartame | Zein | Shellac | Water |
| 1 | 80.62 | 0 | 17.07 | 2.32 |
| 2 | 81.03 | 1.64 | 15.35 | 1.99 |
| 3 | 82.41 | 2.96 | 12.34 | 2.29 |
| 4 | 84.12 | 4.41 | 9.21 | 2.28 |
| 5 | 82.26 | 7.84 | 8.18 | 1.72 |
| 6 | 82.81 | 9.92 | 5.61 | 2.12 |
| 7 | 82.87 | 11.75 | 3.07 | 2.31 |
| 8 | 82.77 | 13.37 | 1.55 | 2.31 |
| 9 | 81.64 | 16.48 | 0 | 1.88 |

The encapsulated aspartame samples were then blended into chewing gum, according to the formulations in the following Table 3.

TABLE 3

| | Composition Of Chewing Gum Samples (% by weight) | | | | | | |
|---|---|---|---|---|---|---|---|
| Example | Encapsulated Aspartame As Described In Table 2 | Gum Base | Sorbitol | Mannitol | Glycerin | Sorbitol Solution (30% Water) | Peppermint Flavor |
| 1 | 0.372 | 27.00 | 40.228 | 12.00 | 8.10 | 11.00 | 1.30 |
| 2 | 0.370 | 27.00 | 40.230 | 12.00 | 8.10 | 11.00 | 1.30 |
| 3 | 0.364 | 27.00 | 40.236 | 12.00 | 8.10 | 11.00 | 1.30 |
| 4 | 0.357 | 27.00 | 40.243 | 12.00 | 8.10 | 11.00 | 1.30 |
| 5 | 0.365 | 27.00 | 40.235 | 12.00 | 8.10 | 11.00 | 1.30 |
| 6 | 0.362 | 27.00 | 40.238 | 12.00 | 8.10 | 11.00 | 1.30 |
| 7 | 0.362 | 27.00 | 40.238 | 12.00 | 8.10 | 11.00 | 1.30 |
| 8 | 0.363 | 27.00 | 40.237 | 12.00 | 8.10 | 11.00 | 1.30 |
| 9 | 0.368 | 27.00 | 40.232 | 12.00 | 8.10 | 11.00 | 1.30 |

The nine chewing gum samples were stored in sealed packages in an 85° F. oven. The samples were analyzed at time intervals of 0, 1, 2, 4 and 19 weeks for aspartame content, using high pressure liquid chromatography. The results of these experiments are plotted in FIG. 1. For all time intervals, the gum sample of Example 8, containing aspartame encapsulated in 90% zein and 10% shellac, exhibited the highest stability of aspartame. From FIG. 1, it is also apparent that aspartame encapsulated with about 75–99% zein and about 1–25% shellac is more stable than aspartame encapsulated with either 100% zein or 100% shellac. FIG. 1 illustrates that the inventive combinations of zein and shellac act as better encapsulants than pure zein, pure shellac, and combinations of zein and shellac not within the inventive ranges.

While the embodiments of the invention disclosed herein are presently considered to be preferred, various modifications and improvements can be made without departing from the spirit and scope of the invention. The scope of the invention is indicated in the appended claims, and all changes that come within the meaning and range of equivalency of the claims are intended to be embraced therein.

We claim:

1. A method of preparing a stabilized high intensity sweetener ingredient, comprising the steps of:
   mixing about 10 to about 50 weight per cent zein with about 90 to about 50 weight per cent ethyl alcohol to form a first mixture,
   mixing about 10 to about 50 weight per cent shellac with about 90 to about 50 weight per cent ethyl alcohol to form a second mixture;
   mixing the first and second mixtures together in sufficient quantities to form a third mixture containing about 80 to about 95 weight per cent zein and about 20 to about 5 weight per cent shellac based on the combined weight of zein and shellac;
   blending the third mixture with a high intensity sweetener to form a sweetener/encapsulant mixture; and
   drying the sweetener/encapsulant mixture to form a stabilized high intensity sweetener ingredient.

2. The method of claim 1 wherein the first mixture is prepared by mixing about 20 to about 35 weight per cent zein with about 80 to about 65 weight per cent ethyl alcohol.

3. The method of claim 1 wherein the first mixture is prepared by mixing about 28 weight per cent zein with about 72 weight per cent ethyl alcohol.

4. The method of claim 1 wherein the second mixture is prepared by mixing about 20 to about 35 weight per cent shellac with about 80 to about 65 weight per cent ethyl alcohol.

5. The method of claim 1 wherein the second mixture is prepared by mixing about 28 weight per cent shellac with about 72 weight per cent ethyl alcohol.

6. A stabilized high intensity sweetener ingredient prepared according to the method of claim 1.

7. A method of preparing a stabilized high intensity sweetener ingredient, comprising the steps of:
   mixing zein and shellac together in a solvent to form an encapsulant containing about 80 to about 95 weight per cent zein and about 20 to about 5 weight per cent shellac, based on the combined weight of zein and shellac;

blending the mixture of zein, shellac and solvent with a high intensity sweetener to form a sweetener/encapsulant mixture containing about 40 to about 95 weight per cent high intensity sweetener and about 5 to about 60 weight per cent encapsulant, based on the combined weight of the high intensity sweetener, zein and shellac; and drying the sweetener/encapsulant mixture to form a stabilized high intensity sweetener ingredient.

8. The method of claim 7 wherein the zein and shellac are mixed together to form an encapsulant containing about 90 weight per cent zein and about 10 weight per cent shellac, based on the combined weight of zein and shellac.

9. The method of claim 7 wherein the mixture of zein, shellac and solvent is combined with a high intensity sweetener to form a sweetener/encapsulant mixture containing about 60 to about 90 weight per cent high intensity sweetener and about 10 to about 40 weight per cent encapsulant, based on the combined weight of high intensity sweetener, zein and shellac.

10. The method of claim 7 wherein the mixture of zein, shellac and solvent is combined with a high intensity sweetener to form a sweetener/encapsulant mixture containing about 80-85 weight per cent high intensity sweetener and about 15.20 weight per cent encapsulant, based on the combined weight of high intensity sweetener, zein and shellac.

11. The method of claim 7 further comprising the step grinding the stabilized high intensity sweetener ingredient.

12. A stabilized high intensity sweetener ingredient prepared according to the method of claim 7.

13. A method of preparing a stabilized high intensity sweetener ingredient, comprising the step of encapsulating a high intensity sweetener in a blended encapsulant mixture of about 80 to about 95 weight per cent zein and about 20 to about 5 weight per cent shellac.

14. The method of claim 13 wherein the encapsulant mixture contains about 90 weight per cent zein and about 10 weight per cent shellac.

15. The method of claim 13 wherein the high intensity sweetener comprises a sweetener selected from the group consisting of sucralose, aspartame, salts of acesulfame, alitame, glycyrrhizin, saccharin and its salts, cyclamic acid and its salts, dihydrochalcones, thaumatin, monellin, and combinations thereof.

16. The method of claim 13 wherein the high intensity sweetener comprises aspartame.

17. A stabilized high intensity sweetener ingredient produced according to the method of claim 13.

18. A stabilized high intensity sweetener ingredient, comprising:

about 40 to about 95 weight per cent of a high intensity sweetener; and about 5 to about 60 weight per cent of a blended encapsulant, the encapsulant comprising about 80 to about 95 weight per cent zein and about 20 to about 5 weight per cent shellac.

19. The stabilized high intensity sweetener ingredient of claim 18, comprising about 60 to about 90 weight per cent of the high intensity sweetener and about 10 to about 40 weight per cent of the encapsulant.

20. The stabilized high intensity sweetener of claim 18, comprising about 80-85 weight per cent of the high intensity sweetener and about 15-20 weight per cent of the encapsulant.

21. The stabilized high intensity sweetener ingredient of claim 18 wherein the high intensity sweetener comprises a sweetener selected from the group consisting of sucralose, aspartame, salts of acesulfame, alitame, glycyrrhizin, saccharin and its salts, cyclamic acid and its salts, dihydrochalcones, thaumatin, monellin, and combinations thereof.

22. The stabilized high intensity sweetener ingredient of claim 18 wherein the high intensity sweetener comprises aspartame.

23. The stabilized high intensity sweetener ingredient of claim 18 wherein the encapsulant comprises about 90 weight per cent zein and about 10 weight per cent shellac.

24. The stabilized high intensity sweetener ingredient of claim 18 in a chewing gum.

25. A chewing gum, comprising a generally water soluble bulk portion, a water insoluble base portion, one or more flavoring agents and a stabilized high intensity sweetener ingredient which includes about 40 to about 95 weight per cent of a high intensity sweetener and about 5 to about 60 weight per cent of a blended encapsulant, the encapsulant comprising about 80 to about 95 weight per cent zein and about 20 to about 5 weight per cent shellac.

26. The chewing gum of claim 25 wherein the stabilized high intensity sweetener ingredient is present in an amount of about 0.001 to about 25 per cent by weight of the chewing gum.

27. The chewing gum of claim 25 wherein the stabilized high intensity sweetener ingredient is present in an amount of about 0.01 to about 5 per cent by weight of the chewing gum.

28. The chewing gum of claim 25 wherein the stabilized high intensity sweetener ingredient is present in an amount of about 0.1 to about 1 per cent by weight of the chewing gum.

29. The chewing gum of claim 25 wherein the high intensity sweetener comprises a sweetener selected from the group consisting of sucralose, aspartame, salts of acesulfame, alitame, glycyrrhizin, saccharin and its salts, cyclamic acid and its salts, dihydrochalcones, thaumatin, monellin and combinations thereof.

30. The chewing gum of claim 25 wherein the high intensity sweetener comprises aspartame.

* * * * *